United States Patent [19]

Gress et al.

[11] Patent Number: 5,199,928
[45] Date of Patent: Apr. 6, 1993

[54] THREADING MACHINE DIE HEAD

[75] Inventors: Paul W. Gress, Bay Village; Michael R. Sanner, Amherst, both of Ohio

[73] Assignee: Emerson Electric Co., St. Louis, Mo.

[21] Appl. No.: 878,297

[22] Filed: May 6, 1992

[51] Int. Cl.[5] .............................. B21H 3/02
[52] U.S. Cl. ........................ 470/75; 408/73; 408/15; 470/73; 470/77
[58] Field of Search ............ 470/75, 73, 76, 77, 470/79, 80, 81; 408/73, 15, 12, 148, 173, 176, 178

[56] References Cited

U.S. PATENT DOCUMENTS

| | | |
|---|---|---|
| 3,820,180 | 6/1974 | Birkestrand et al. ............ 470/75 |
| 3,864,774 | 2/1975 | Fohl .................................. 470/76 |
| 4,288,181 | 9/1981 | Sakaguchi et al. ............... 408/15 |
| 4,329,098 | 5/1982 | Maruyama ....................... 408/15 |
| 4,370,770 | 2/1983 | Wagner . | 
| 4,396,316 | 8/1983 | Sakaguchi et al. ............... 408/15 |
| 4,880,340 | 11/1989 | Taki et al. ....................... 408/176 |

FOREIGN PATENT DOCUMENTS

| | | |
|---|---|---|
| 57-19218 | 4/1982 | Japan . |
| 57-20101 | 4/1982 | Japan . |
| 57-66817 | 4/1982 | Japan . |
| 58-11476 | 3/1983 | Japan . |
| 58-41075 | 9/1983 | Japan . |
| 60-7931 | 1/1985 | Japan . |
| 2-22178 | 6/1990 | Japan . |

Primary Examiner—Lowell A. Larson
Assistant Examiner—Michael J. McKeon
Attorney, Agent, or Firm—Body, Vickers & Daniels

[57] ABSTRACT

An annular thread cutting die head for a power driven threading machine is comprised of an annular support plate assembly supporting a plurality of radially displaceable threading cutting dies spaced apart about the axis of the die head, and a cam plate assembly coaxial with and pivotal relative to the support plate assembly to radially displace the cutting dies. The cam plate assembly is spring biased to pivot relative to the support plate assembly in the direction to radially retract the cutting dies, and pivoting in the latter direction is controlled by a keeper mounted on the support plate assembly and engaging a keeper track on the cam plate assembly. The keeper is mounted on the support plate assembly for pivotal displacement about a keeper axis parallel to the die head axis, and pivotal displacement of the keeper is controlled by a lever mechanism actuated by a workpiece being threaded to provide for progressive displacement of the cam plate assembly and receding displacement of the cutting dies during the threading operation.

35 Claims, 6 Drawing Sheets

THREADING MACHINE DIE HEAD

BACKGROUND OF THE INVENTION

The present invention relates to the art of power driven threading machines and, more particularly, to a thread cutting die head having improved control for the receding of thread cutting dies in connection with cutting a tapered thread on a workpiece.

Power driven thread cutting machines are of course well known and basically comprise a rotatable spindle and chuck assembly for rotating a workpiece to be threaded, and a thread cutting die head supported on a tool carriage for axial displacement relative to the workpiece to advance thread cutting dies supported by the die head into thread cutting engagement with the end of the workpiece. Generally, the die head assembly is pivotally supported on one side of the tool carriage for displacement between stored and use positions. In the use position, the axis of the die head is aligned with the workpiece axis, and the side of the die head opposite the pivotal mounting engages the corresponding side of the tool carriage to axially and vertically support the die head in the use position.

It is likewise well known in connection with cutting a tapered thread on a workpiece to release the thread cutting dies at the end of the thread cutting operation for displacement radially outwardly of the workpiece, or to provide for the thread cutting dies to progressively recede radially outwardly relative to the workpiece near the end of or throughout the thread cutting operation, followed by displacement away from the workpiece. In such die heads, the thread cutting dies are supported for radial displacement inwardly and outwardly relative to the die head axis and are so displaced by a cam plate coaxial with and pivotal about the die head axis. The cam plate is interengaged with the thread cutting dies in a manner whereby displacement of the cam plate in opposite directions about the die head axis displaces the thread cutting dies radially inwardly and outwardly thereof. The cam plate is spring biased to displace the thread cutting dies radially outwardly, and the thread cutting operation is initiated with the cam plate latched in a given angular position against the spring bias. Release of the cam plate provides for the spring bias against the cam plate to displace the latter to in turn displace the thread cutting dies radially outwardly of the workpiece. If such release of the cam plate is at the end of a thread cutting operation, the displacement of the cam plate and thus receding of the thread cutting dies, takes place immediately to retract the thread cutting dies to their outermost positions in which they are spaced from the workpiece. If such release is to provide for the progressive receding of the thread cutting dies near the end of or during the entire threading operation, angular displacement of the cam plate under the bias of the cam plate spring is controlled to achieve such progressive receding until the end of the thread cutting operation at which point the cam plate is immediately released for further angular displacement by the biasing spring to retract the thread cutting dies to their outermost positions away from the workpiece.

Heretofore, progressive release of the cam plate near the end of a thread cutting operation, or during the entire threading operation has been achieved through the use of a lever actuated latch arrangement including a lever pivotally mounted on the die head and extending into the path of movement of a workpiece being threaded. The lever is engaged and displaced by the workpiece and in turn either disengages from the cam plate, immediately or progressively, or displaces another component which immediately releases or controls the progressive release of the cam plate to achieve gradual receding of the thread cutting dies near the end of or during the threading operation. Prior art arrangements for achieving progressive release of the cam plate in the foregoing manner near the end of the threading operation are shown, for example, in U.S. Pat. No. 4,288,181 to Sakaguchi et al, and Japanese Patent Application No. 57-20101. Prior art arrangements for achieving the progressive release of the cam plate in the foregoing manner during the entire threading operation are shown, for example, in U.S. Pat. No. 4,880,340 to Taki et al, Japanese Patent Laid-Open No. 57-66817 to Sakamoto, and Japanese UM Laid-Open No. 60-7931 to Gotov.

In the prior art arrangements providing for progressive release of the cam plate, the relative displacement between the component parts of the release mechanism is directionally transverse sliding displacement during which considerable force is applied between the relatively sliding surfaces resulting in rapid wear and, thus a loss in the accuracy and/or uniformity of threads being cut. More particularly in this respect, the lever or the component displaced thereby moves axially of the die head and is engaged by the cam plate or a component thereon which is biased by the cam plate biasing spring to pivot about the die head axis and thus transverse to the direction of movement of the lever or the component displaced thereby. Thus, during a threading operation, the relative displacement between the interengaging surfaces of the component parts is simultaneously axially and circumferentially with respect to the die head axis. It will be appreciated that such directionally transverse sliding interengagement between the component parts, which is repeated for each threading operation, results in rapid wearing of the component parts. Both the point of release of the cam plate at the end of a threading operation and control of the receding action of the thread cutting dies by the progressive release of the cam plate during a threading operation are important with respect to achieving accurate thread cutting and/or consistently uniform thread cutting. It will be appreciated that as the slidably engaging component parts of the release mechanism progressively wear, such accuracy and/or consistency is progressively reduced.

SUMMARY OF THE INVENTION

In accordance with the present invention, a threading machine die head is provided with a release mechanism for the thread cutting dies which advantageously minimizes or eliminates wearing interengagement between the component parts thereof, thus improving the life of the component parts as well as the ability to continuously achieve accurate thread cutting and/or consistently uniform thread cutting. More particularly in accordance with the present invention, the cam plate of a die head is releasably held in a first angular position at the beginning of a thread cutting operation, against the bias of the cam plate spring, by a keeper component which is mounted on a fixed component of the die head for pivotal displacement about a keeper axis which is parallel to the die head axis. The keeper is pivotal between latched and released positions and, in its latched position, engages and holds the cam plate in its first angular position. In the released position of the keeper, the latter disengages the cam plate to achieve full receding displacement of the thread cutting dies. Pivotal displacement of the keeper about its axis from the latched toward the released position thereof is controlled in response to movement of the workpiece being threaded relative to the die head and, preferably, is controlled so as to provide for the progressive receding of the thread cutting dies throughout the thread cutting operation. The pivotal mounting of the keeper for displacement about an axis parallel to the die head axis advantageously provides for the direction of relative displacement and interengagement between the keeper and cam plate to be radial and circumferential rather than axial and circumferential. This interrelationship advantageously reduces frictional interengagement between the component parts during a threading operation.

Preferably, the cam plate is releasably interengaged with a slide plate which enables adjustment of the cam plate and thus the cutting dies to facilitate threading workpieces of different diameters. The slide plate includes a keeper track interengaging with the keeper, and the keeper and keeper track are cooperatively contoured and structurally interrelated for pivotal displacement of the keeper to provide for the progressive displacement of the side plate and cam plate in the direction to displace the thread cutting dies in the receding direction thereof, thus to achieve progressive receding of the dies throughout the thread cutting operation. Pivotal displacement of the keeper from its latched to its released position is controlled by a lever mechanism which is engaged and displaced by a workpiece during a threading operation. The lever mechanism is pivotally mounted on the die head and is biased to an initial position in which it engages and supports the keeper in the latched position of the latter. The lever mechanism is progressively displaced against its bias by a workpiece being threaded and controls displacement of the keeper from its latched towards its released position, which displacement of the keeper takes place through the interengagement of the keeper and the keeper track and the biasing force of the cam plate spring. The pivotal keeper and lever arrangement provides a structurally simple and structurally compact release mechanism for controlling the release of the cam plate and thus receding movement of the thread cutting dies. Moreover, the release mechanism is economical to produce and efficient in operation while affording longevity with respect to the life of the component parts thereof and a prolonged ability to obtain accurate and/or consistently uniform thread cutting.

It is accordingly an outstanding object of the present invention to provide a die head for a power driven threading machine having an improved mechanism for controlling the release of the thread cutting dies for movement in the receding direction thereof relative to the die head.

Another object is the provision of a release mechanism for a die head of the foregoing character which reduces the wearing interengagement between the component parts of the release mechanism relative to such mechanisms heretofore available.

Still another object is the provision of a release mechanism for a die head of the foregoing character including cam plate and keeper components structurally interrelated to control the receding movement of the thread cutting dies through an interengaging relative displacement therebetween which is radial and circumferential with respect to the die head axis.

A further object is the provision of a release mechanism for a die head of the foregoing character which is actuated by engagement of a workpiece with a lever which controls relative displacement between the keeper and cam plate to achieve receding movement of the thread cutting dies.

Yet another object is the provision of a release mechanism for a die head of the foregoing character wherein the keeper is pivotal about an axis parallel to the axis of the die head and engages a keeper surface on the cam plate which extends in a direction transverse to the die head axis and wherein the keeper and keeper surface interengage under a bias which is radial and circumferential.

Still a further object is the provision of a release mechanism of the foregoing character which is structurally simple and compact, efficient in operation and promotes prolonged life for the component parts of the release mechanism.

Still another object is the provision of a release mechanism for a thread cutting die head of the foregoing character which provides for improved continuity with respect to achieving accurate and/or consistently uniform thread cutting.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
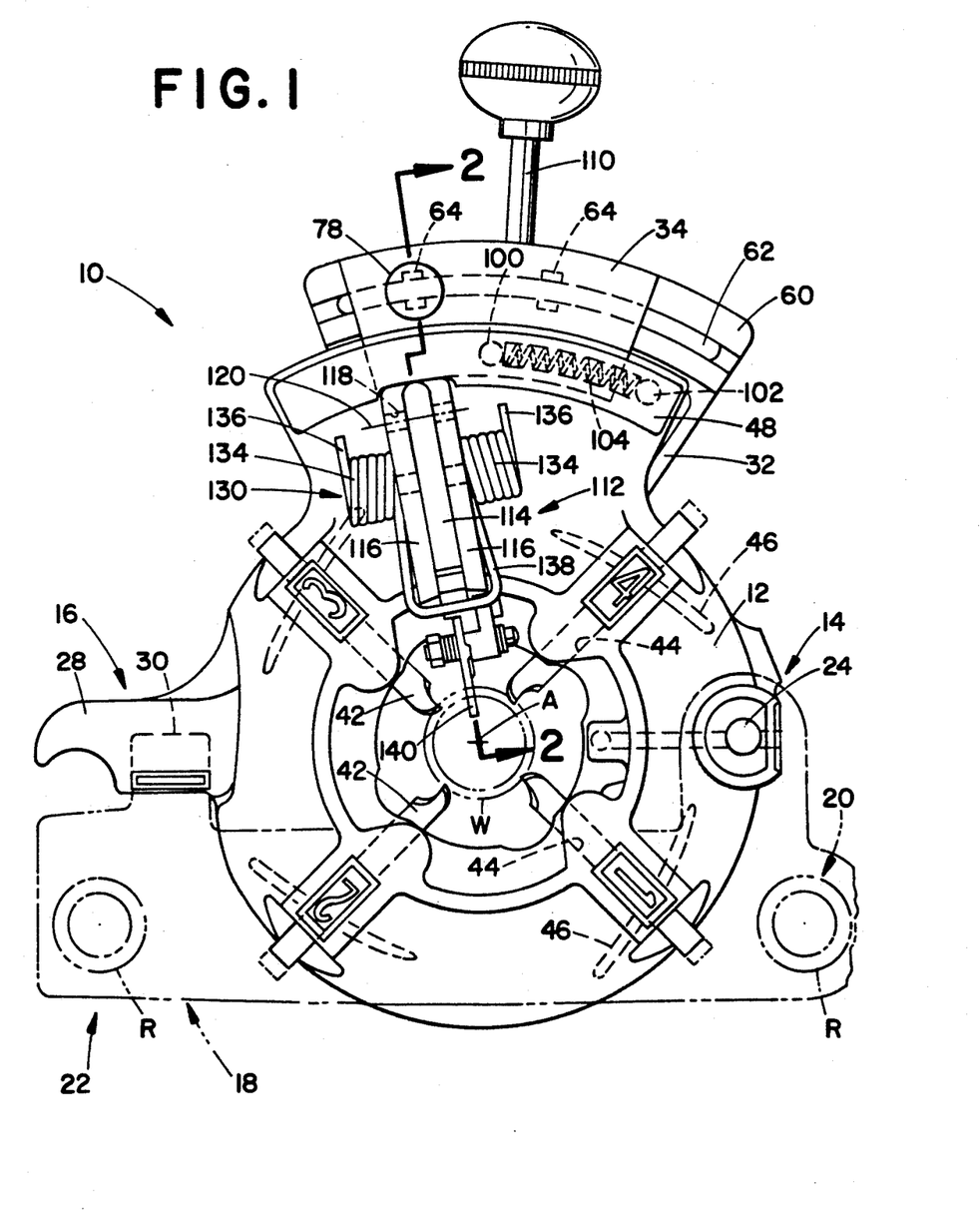
FIG. 1 is a front end elevation view of a die head in accordance with the present invention.

Referring now in greater detail to the drawings wherein the showings are for the purpose of illustrating a preferred embodiment of the invention only and not for the purpose of limiting the invention, FIG. 1 shows a thread cutting die head 10 having an axis A and including a support plate 12 having laterally opposite sides 14 and 16. In a well known manner, and as schematically shown in FIG. 1, sides 14 and 16 are supported on a threading machine tooling carriage 18 having laterally opposite sides 20 and 22 slidably received on support rails R of the threading machine, not shown.

More particularly in this respect, side 14 of support plate 12 is provided with a pin 24 received in an opening therefor in side 20 of carriage 18, and side 16 of support plate 14 is provided with a laterally outwardly extending arm 28 received between longitudinally spaced apart upstanding plates 30 on side 22 of carriage 18, only one of which plates 30 is visible in FIG. 1. FIG. 1 illustrates die head 10 in the use position thereof, and pin 24 supports the die head for pivotal displacement clockwise in FIG. 1 about the pin axis to a storage position laterally outwardly adjacent carriage 18.

Figure 2:
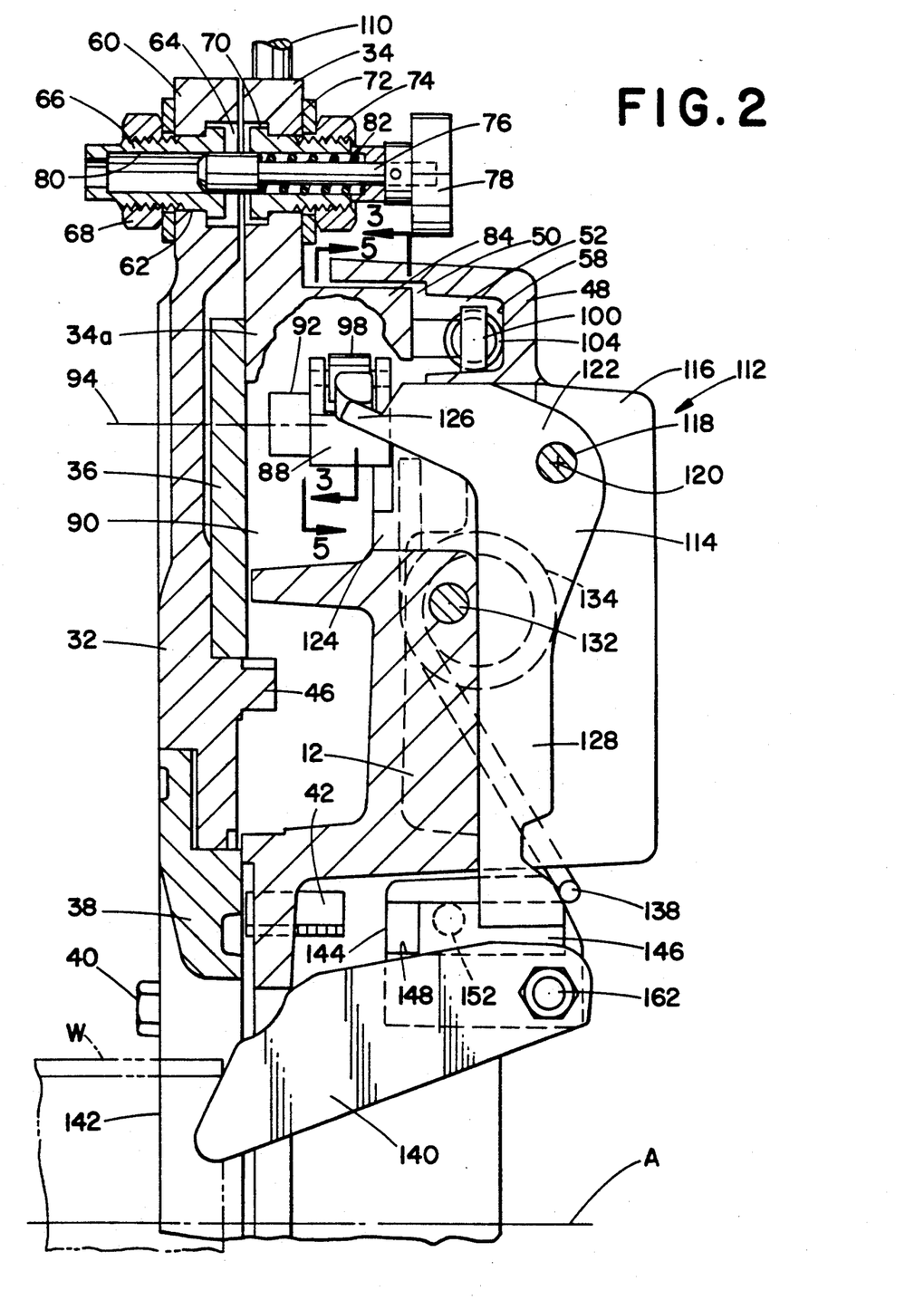
FIG. 2 is a cross-sectional elevation view of the die head taken along line 2—2 in FIG. 1.

As will be seen from FIGS. 1 and 2, die head 10 further includes a cam plate assembly coaxial with axis A and rotatable thereabout relative to support plate 12. In the embodiment illustrated, the cam plate assembly comprises an annular cam plate 32 and an arcuate cam plate slide 34. Die head 10 further includes an annular support ring 36 and an annular retaining plate 38 secured to support plate 12 by a plurality of fasteners 40. Support plate 12 carries a plurality of thread cutting dies 42 each disposed in a corresponding radially extending pocket 44 which opens toward cam plate 32 and which pockets are covered by support ring 36 so as to axially retain the cutting dies therein. As is well known, each of the cutting dies 42 is provided with a slot, not shown, facing cam plate 32, and the cam plate includes radially and circumferentially extending arcuate cam fingers 46 each engaging in the slot of the corresponding cutting die 42. Accordingly, it will be appreciated that rotation of cam plate 32 relative to support plate 12 in opposite directions about die head axis A provides for the cutting dies 42 to be radially displaced inwardly and outwardly relative to the die head assembly and axis A. Cam plate 32 and cam plate slide 34 are adapted to be releasably interengaged in the manner set forth more fully hereinafter so as to be pivotal together and relative to one another about axis A, and the cam plate and cam plate slide are axially captured between support plate 12 and retaining plate 38 for such pivotal movement about axis A and accordingly relative to the support plate assembly defined by support plate 12 and retaining plate 38.

With reference in particular to FIGS. 1-5 of the drawing, support plate 12 includes an upwardly extending arcuate section 48 provided with a circumferentially extending recess opening toward cam plate 32 and slide 34 and comprising stepped outer and inner recess portions 50 and 52 respectively. Outer recess portion 50 includes radially outer and inner surfaces 54 and 56, respectively, and inner portion 52 includes an inner wall 58. Cam plate 32 includes an upper arcuate section 60 extending radially upwardly beyond upper portion 48 of support plate 12, and cam plate slide 34 is an arcuate plate member having a lower end adjacent recess 50 in support plate 12 and an upper end which extends radially upwardly beyond support plate portion 48 and facially engages upper portion 60 of cam plate 32. Upper portion 60 of cam plate 32 is provided with an arcuate slot 62 therethrough and which is provided at spaced locations along the length thereof with non-circular recesses 64 receiving the head of a tubular externally threaded bolt 66 which extends through slot 62 and is secured in place by a corresponding nut 68. Recesses 64, only two of which are shown, are located along slot 62 at positions corresponding to a number of different diameter workpieces which are adapted to be threaded with the die head. Cam plate slide 34 is provided on its rear face with a non-circular recess 70 receiving the head of an externally threaded tubular bolt 72 which extends through an opening therefor in slide plate 34 and is secured thereto by means of a nut 74. Tubular bolt 72 receives and slidably supports an elongated pin 76 having a knob 78 on the outer end thereof. Pin 76 extends into bore 80 of the tubular bolt 66 aligned therewith and, preferably, is biased into such position by a biasing spring 82 within the bore of bolt 72. When cam plate 32 and cam slide plate 34 are interengaged by pin 76, they are adapted to pivot together in opposite directions about axis A, and when pin 76 is withdrawn from bore 80 by pulling on knob 78 against the bias of spring 82 the cam plate and cam slide plate are free to pivot relative to one another in opposite directions about axis A.

It will be appreciated from the foregoing description of cam plate 32 that pivotal movement of the latter about axis A displaces cam fingers 46 thereon to in turn radially displace thread cutting dies 42. Accordingly, pivotal displacement of the cam plate relative to cam plate slide 34 with pin 76 released from bore 80 of one of the bolts on the cam plate and into alignment with the bore of another bolt on the cam plate provides for radially displacing the thread cutting dies into appropriate radial positions for cutting threads on a workpiece having a diameter corresponding to that of the selected bolt 66. The cam plate assembly comprising cam plate 32 and cam plate slide 34 is then pivoted as a unit relative to axis A into a latched position relative to support plate 12, as will become apparent hereinafter, and such displacement displaces cam plate 32 relative to cutting dies 42 so as to radially position the thread cutting dies in the appropriate positions for the dies at the beginning of the thread cutting operation. When the cam plate assembly is in its latched position, the die head and the end of a workpiece to be threaded are brought into axial interengagement with the end of the workpiece in the entrance end of the die head with respect to the direction of threading. In FIG. 2 the entrance end is on the left hand side of the die head and, when the dies and workpiece are engaged, the workpiece is rotated to initiate the thread cutting operation. As is well known, once the thread cutting dies actively engage the workpiece at the beginning of the thread cutting operation, the carriage and thus the die head assembly are automatically displaced in the direction inwardly of the end of the workpiece, to the left in FIG. 2, under the influence of the cutting action.

In accordance with the preferred embodiment of the die head disclosed herein, the workpiece actuates a release mechanism which controls displacement of the cam plate assembly from the latched position to the released position such that the thread cutting dies progressively recede radially outwardly of the workpiece during the thread cutting operation. More particularly in this respect, as will be seen from FIGS. 2-5 of the drawing, the lower end 34a of cam plate slide 34 faces recess 50 in support plate 12 and includes an integral keeper track portion 84 which extends into recess 50 and which is machined to provide a circumferentially extending keeper track including track portions 86 and 87. A keeper member 88 is positioned radially beneath tracks 86 and 87 and is mounted in a recess 90 in support plate 12 by means of a pin 92 which supports the keeper member for pivotal movement in opposite directions about a keeper axis 94 parallel to die head axis A. Keeper member 88 has a nose 96 spaced from axis 94 and engaging keeper track 86, and is provided with a roller 98 adapted to rollingly engage keeper track 87 as set forth more fully hereinafter. The keeper member further includes a keeper finger 89 by which the keeper is biased as explained hereinafter to bias nose 96 and roller 98 radially outwardly into engagement with the keeper tracks. The keeper finger is spaced from keeper axis 94 and extends transverse thereto. Keeper track portion 84 is provided with a spring abutment screw 100 which has a head positioned in inner recess 52 in upper portion 48 of support plate 12 and, as best seen in FIG. 5, inner wall 58 of the recess 52 is provided with an abutment screw 102 which has a head in the recess and circumferentially spaced from abutment screw 100. A cam plate biasing spring 104 is received in recess 52 and is in compression between the heads of abutment screws 100 and 102, whereby it will be appreciated with respect to the orientations of the component parts shown in FIGS. 1, 3 and 4 of the drawing that spring 104 biases the cam plate assembly counterclockwise about axis A relative to support plate 12 and, thus in the direction of arrow 103 in FIGS. 3 and 4.

When the component parts are in the latched position shown in FIG. 3, keeper 88 is biased clockwise about axis 94 as described hereinafter and holds the cam plate assembly defined by cam plate 32 and cam plate slide 34 against displacement under the bias of spring 104. As keeper 88 pivots counterclockwise about axis 94, nose 96 pivots counterclockwise about axis 94 allowing the cam plate assembly to gradually move counterclockwise about die head axis A under the bias of spring 104 toward the released position shown in FIG. 4. Preferably, lower end 34a of cam plate slide 34 is machined to provide recesses 105 at the circumferentially opposite ends of keeper track portion 84 receiving rollers 106 which rollingly engage against radially outer surface 54 of recess 50 to facilitate displacement of the cam plate assembly without sliding frictional interengagement between keeper track portion 84 and surface 54 of recess 50. When keeper 88 pivots counterclockwise in FIG. 3 about axis 94 to the extent that nose 96 reaches end 86a of keeper track 86, the threading operation is completed and displacement of nose 96 below end 86a and keeper surface 87 immediately releases the cam plate assembly for further displacement counterclockwise in FIG. 3 to the released position shown in FIG. 4, whereby the thread cutting dies are quickly displaced radially outwardly from the workpiece. During such final release of the cam plate assembly, roller 98 rollingly engages track 87, as will be appreciated from FIG. 4.

Figure 3:
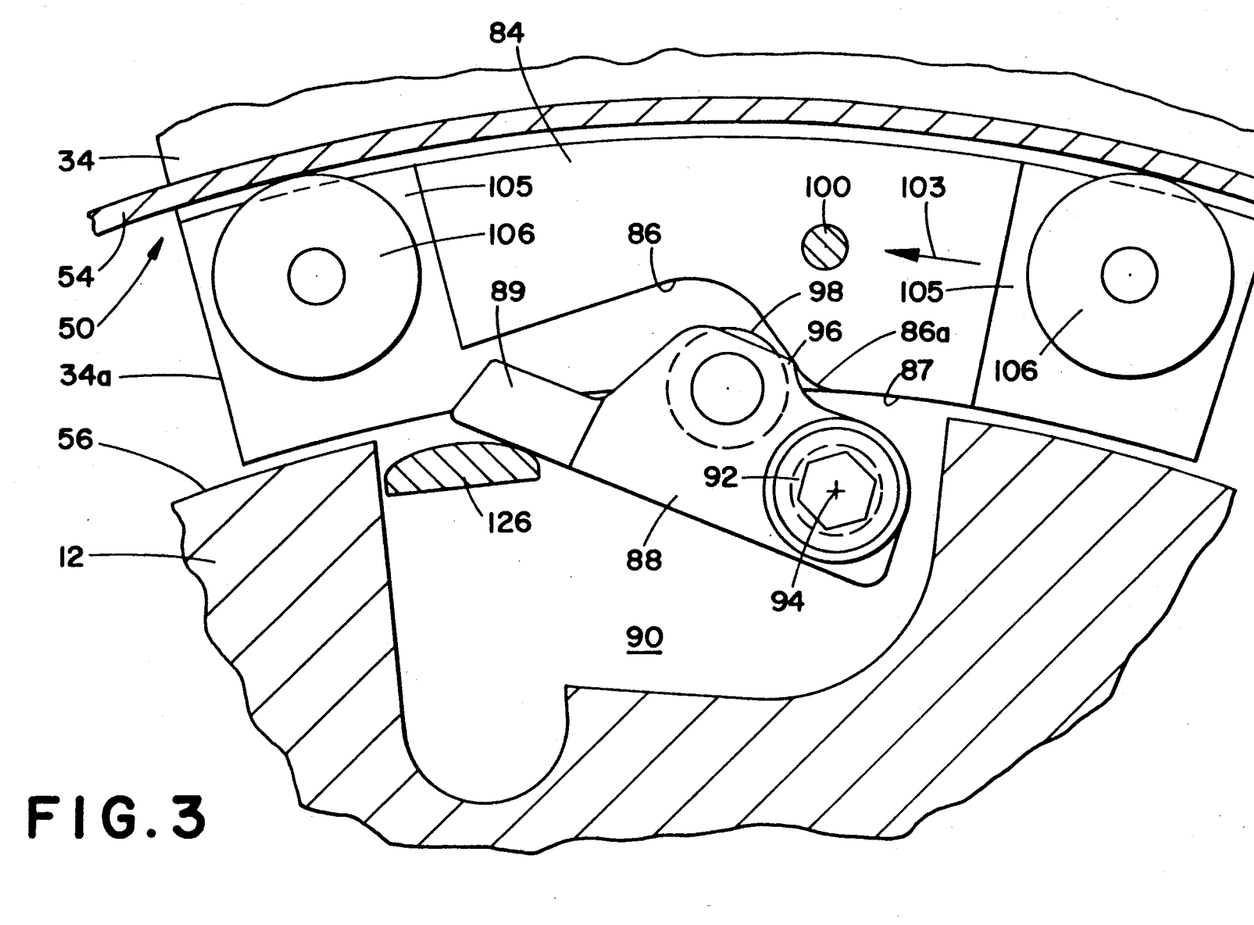
FIG. 3 is an elevation view, partially in section, of the cam plate and keeper components of the release mechanism taken along line 3—3 in FIG. 2 and showing the parts in the latched position of the keeper.
Figure 4:
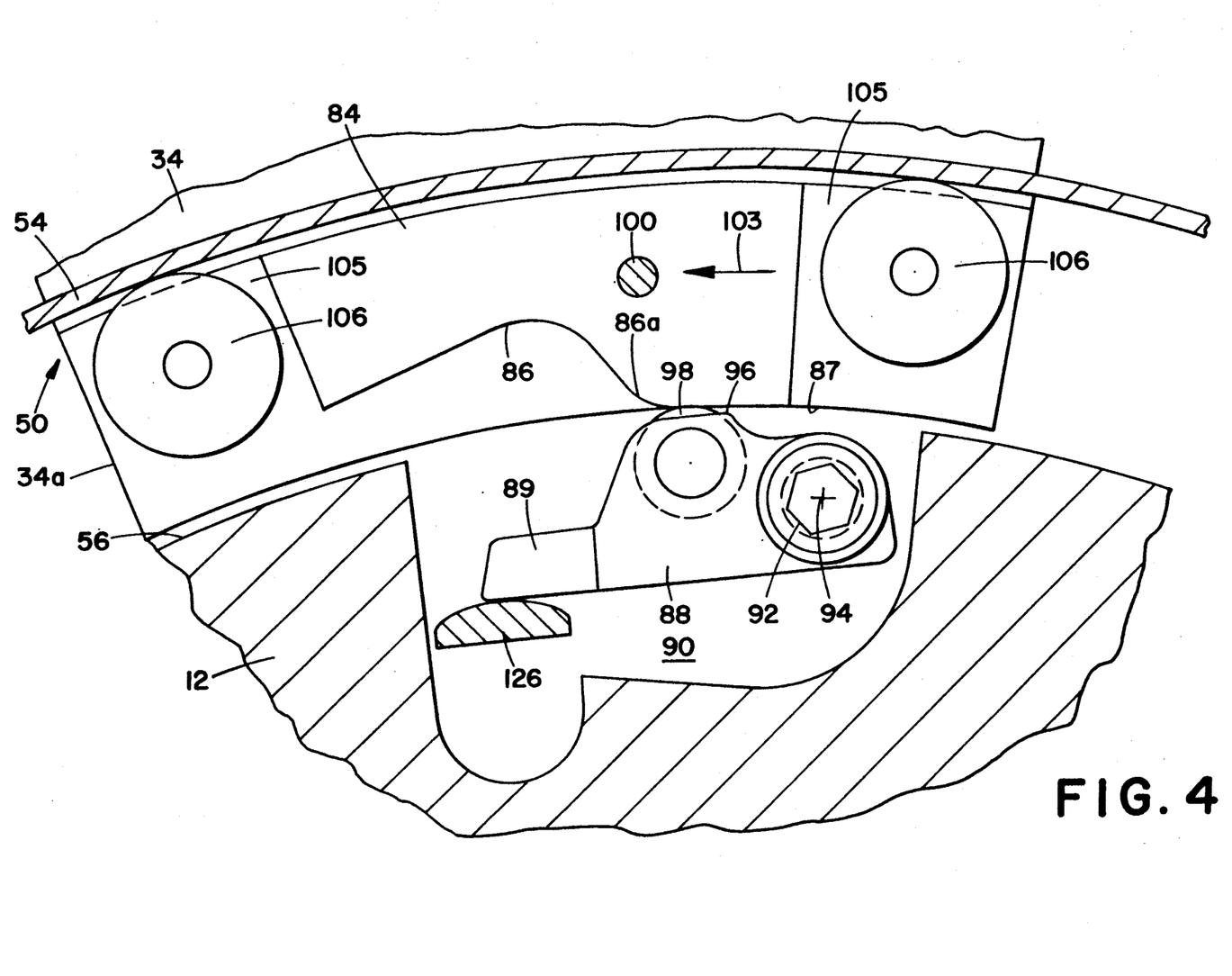
FIG. 4 is a view similar to FIG. 3 and showing the parts in the released position of the keeper.
Figure 5:
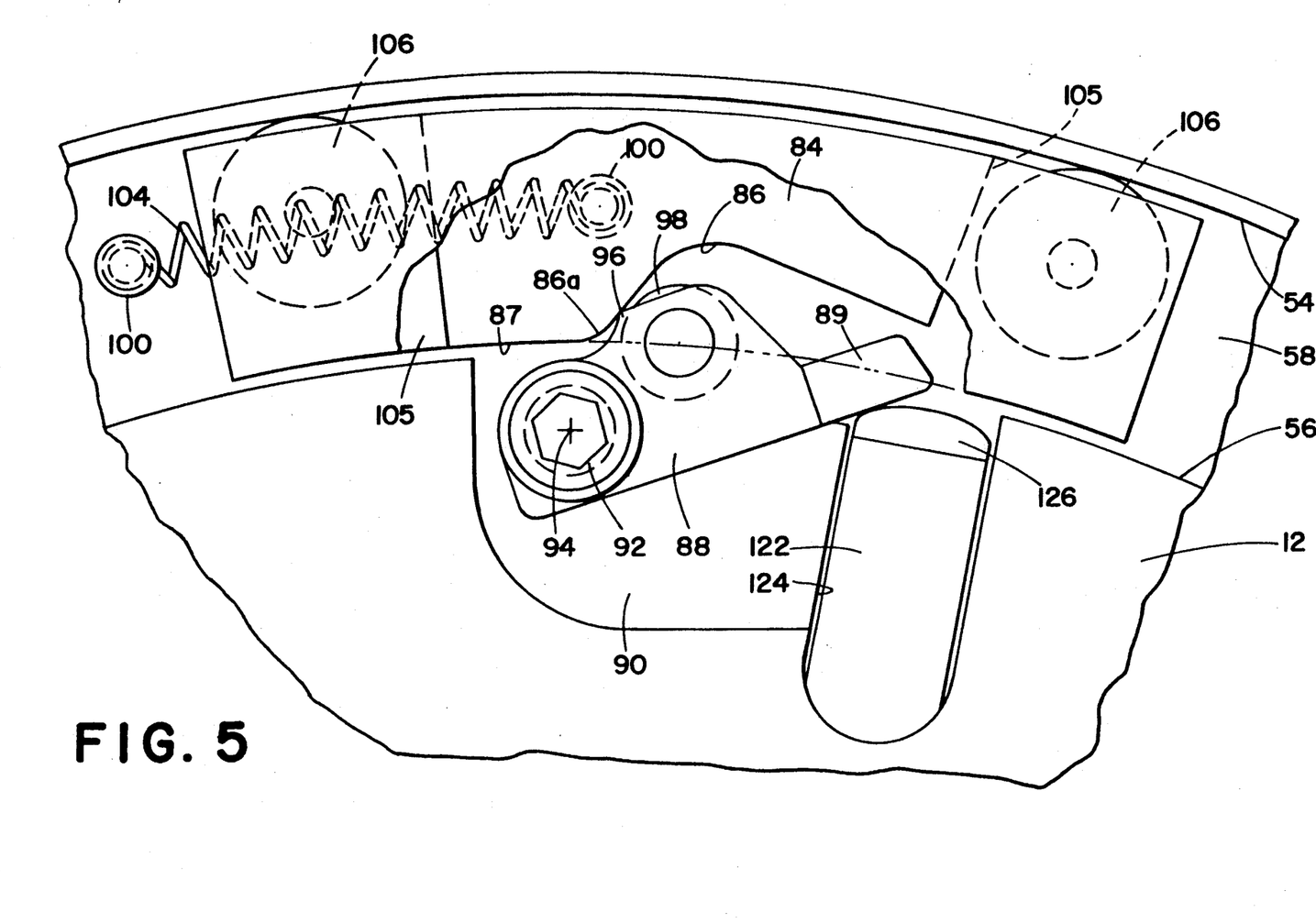
FIG. 5 is an elevation view, partially in section, of the release mechanism taken along line 5—5 in FIG. 2 and showing the parts in the latched position of the keeper.

With further reference to FIGS. 1-5, keeper 88 is biased radially outwardly into the latched position thereof shown in FIG. 3 by a lever mechanism 112 which is actuated by a workpiece W during threading thereof to control the displacement of the keeper counterclockwise in FIG. 3 toward the released position thereof shown in FIG. 4. Lever mechanism 112 includes an inverted L-shaped lever member 114 received between mounting and guide plates 116 on support plate 12 and interconnected with plates 116 by means of pin 118. Pin 118 supports the lever member for pivotal movement in opposite directions about a lever axis 120 which extends transverse to die head axis A. The lever member includes a leg 122 extending axially of the die head and rearwardly from pivot pin 118 through an opening 124 in support plate 12 which opens into recess 90 thereof, and leg 122 terminates in a lever finger 126 which underlies keeper finger 89. Lever member 114 further includes a lever arm 128 which extends downwardly from pivot pin 118, and lever member 114 is biased clockwise about lever axis 120 in FIG. 2 of the drawing by means of a U-shaped biasing spring 130. Spring 130 is mounted on support plate 12 of the die head by means of a pin 132 extending through mounting plates 116 and receiving spring coils 134 in the legs of the spring. The opposite ends 136 of the spring legs engage against support plate 12, and the closed end 138 of the spring biasingly engages the outer edge of lever arm 128. Accordingly, lever finger 126 is biased clockwise in FIG. 2 and thus upwardly in FIGS. 3 and 4 against keeper finger 89, whereby keeper 88 is biased clockwise in FIGS. 3 and 4 relative to keeper axis 94 thus to bias keeper nose 96 and roller 98 into engagement with keeper tracks 86 and 87.

It will be appreciated that when the component parts are in the positions shown in FIG. 3, the bias of lever spring 130 is sufficient to hold keeper 88 in the latched position thereof so as to hold the cam plate assembly against displacement by cam plate spring 104. It will be appreciated too that keeper 88 and keeper track 86 are structured and contoured to cooperatively control displacement of the cam plate assembly from the latched to the released position thereof to achieve the desired receding displacement of the thread cutting dies during the cutting operation and the immediate release thereof at the end of the cutting operation. Pivotal movement of the cam plate assembly in the direction of release is limited by a stop, not shown, on the inner side of support plate 12 in the path of at least one of the cam fingers 46 on cam plate 32. When the thread cutting dies are fully released as described hereinabove, the die head is prepared for a subsequent threading operation by displacing the cam plate assembly clockwise from the released position shown in FIG. 4 back to the latched position shown in FIG. 3, and cam plate slide 34 is provided with an operating handle 110 for this purpose. Roller 98 on keeper 88 facilitates such displacement of the cam plate assembly which is against the bias of both the cam plate spring 104 and lever spring 130.

Lever mechanism 112 is adapted to be actuated by workpiece W during a thread cutting operation to pivot lever 114 counterclockwise in FIG. 2 about lever axis 120 and against the bias of lever spring 130. Such pivotal displacement of lever 114 controllably releases the cam plate assembly through the relative displacement of keeper 88 and keeper track 86 in the manner described hereinabove. Pivotal displacement of the lever 114 is achieved by a trigger member 140 mounted on the radially inner end of lever arm 128 and extending therefrom axially inwardly toward the entrance end of the die head. Trigger member 140 has a nose portion 142 at the inner end thereof which is contoured to engage with workpieces of different diameter so as to initiate the pivotal displacement of the lever mechanism at the appropriate time for a workpiece of given diameter.

Figure 6:
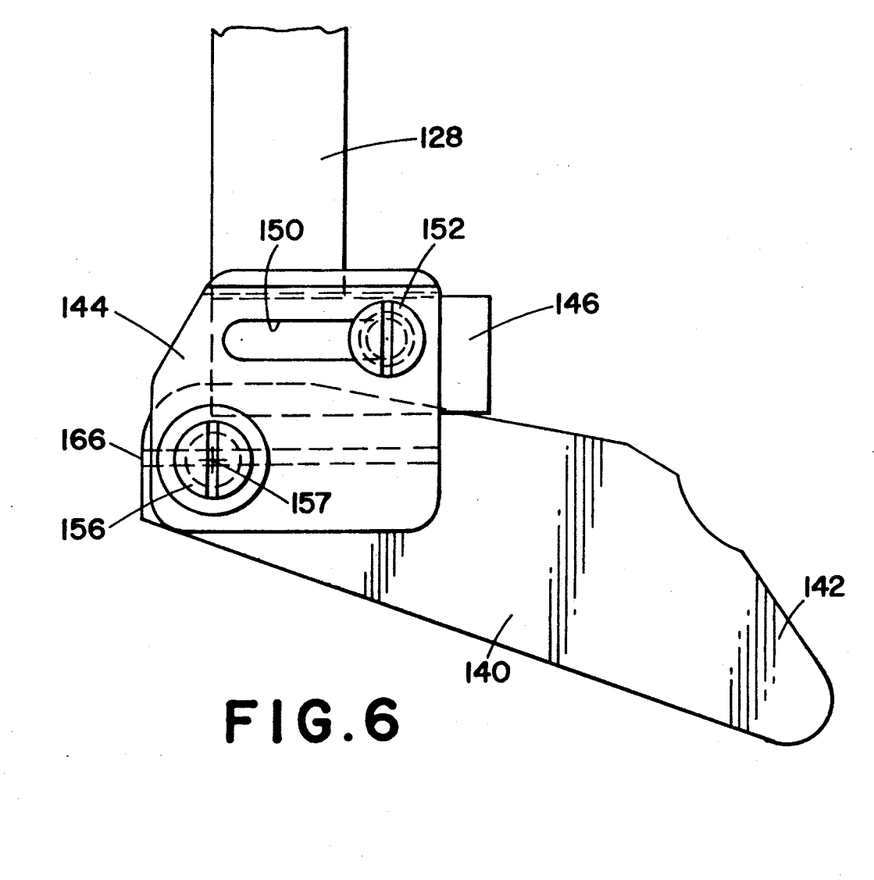
FIG. 6 is an enlarged side elevation view of the trigger portion of the lever assembly of the release mechanism looking from right to left in FIG. 1; and, FIG. 7 is a front end elevation view of the trigger portion of the lever assembly looking in the direction from left to right in FIG. 6.
Figure 7:
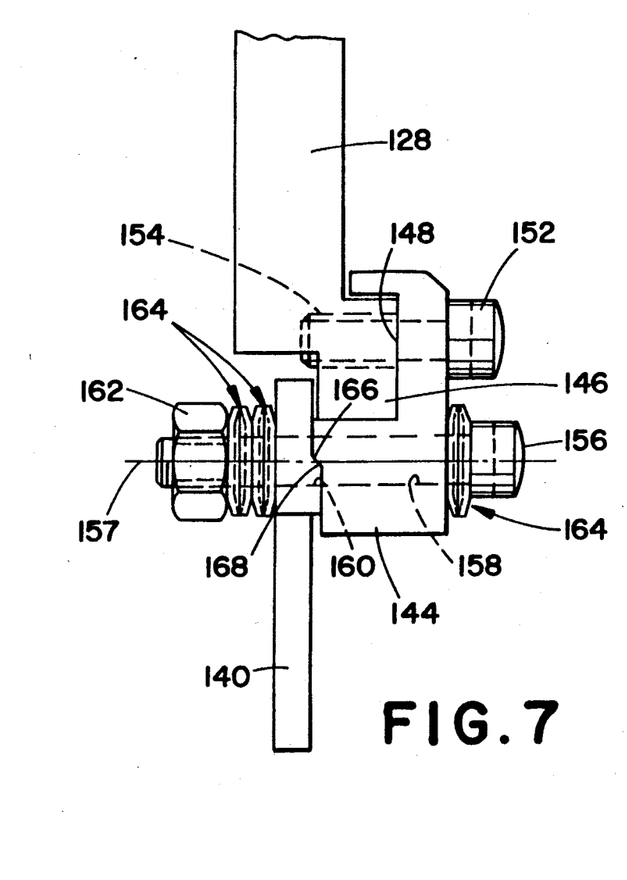

Preferably trigger member 140 is mounted on the inner end of lever arm 128 for axial adjustment of the position thereof relative to the lever arm and to provide for release of the trigger relative to the lever arm in the event the latter should fail to pivot at the beginning or at some point during a thread cutting operation. The latter release capability also provides for the intentional positioning of the trigger out of the path for engagement by a workpiece when it is desired to cut a straight thread on the workpiece rather than a tapered thread. In the embodiment illustrated, as best seen in FIGS. 6 and 7, these features are achieved by pivotally mounting trigger 140 on a support member 144 which is slidably mounted on the lower end of lever arm 128 for adjustment axially thereof. More particularly in this respect, the lower end of lever arm 128 is provided with a laterally offset axially extending leg 146, and trigger support member 144 is provided with a recess 148 slidably receiving leg 146. The wall of the recess facing leg 146 is provided with an elongated axially extending slot 150, and a threaded bolt 152 extends through slot 150 and into threaded engagement with an opening 154 therefor in leg 146. Accordingly, it will be appreciated that trigger support member 144 is axially slidable relative to leg 146 and is adapted to be secured in place in an adjusted position relative to leg 146 by bolt 152. Trigger member 140 is pivotally mounted on trigger support member 144 by means of a bolt 156 which provides a trigger axis 157 parallel to lever axis 120. Bolt 156 extends through openings 158 and 160 therefor in support member 144 and trigger 140, respectively, and receives a lock nut 162 on the end thereof outwardly adjacent trigger member 140. Pairs of spring washers 164 are interposed between the head of bolt 156 and the corresponding side of trigger support member 144 and between lock nut 162 and the corresponding side of trigger member 140. Further, the facially engaging sides of trigger member 140 and trigger support member 144 are provided with interengaging detent surfaces 166 and 168, respectively, which extend axially with respect to die head axis A and are axially inclined with respect to trigger pivot axis 157.

Lock nut 162 is threaded onto bolt 156 sufficiently to axially engage detent surfaces 166 and 168 against the bias of spring washers 164. In response to sufficient force on nose 142 of trigger 140 tending to pivot the latter about trigger axis 157, detent surfaces 166 and 168 interengage to cam trigger member 140 axially away from trigger mounting member 144 against the bias of spring washer 164 to release the trigger member for free pivotal displacement about the trigger axis. Accordingly, should the lever mechanism fail to pivot about lever axis 120 at the beginning or during a threading operation, the relative axial displacement between a workpiece and trigger 140 will impose a force on the trigger member causing the latter to be released in the foregoing manner so as to preclude damage to the workpiece or to the component parts of the die head assembly including the cam plate release mechanism. Further, if it is desired to cut a straight thread on a workpiece rather than a tapered thread which requires receding action of the thread cutting dies, trigger member 140 can be manually pivoted clockwise about trigger axis 157 from the position shown in FIG. 6 to a position in which the trigger extends horizontally to the left in FIG. 6, or to the right in FIG. 2, whereby the trigger member is spaced radially outwardly from the largest diameter workpiece which can be accommodated in the die head. A workpiece is then threaded without the thread cutting dies receding during the threading operation which enables cutting a straight thread rather than a tapered thread and, at the end of the thread cutting operation, trigger member 140 can be manually displaced to pivot lever mechanism 112 counterclockwise in FIG. 2 about lever axis 120 so as to immediately release the cam plate assembly for full retraction of the thread cutting dies radially outwardly from the workpiece.

While considerable emphasis has been placed herein on the structures and structural interrelationship between the component parts of the preferred embodiment of the invention, it will be appreciated that other embodiments of the invention can be made and that many changes can be made in the preferred embodiment without departing from the principles of the invention. In this respect, for example, the keeper member could rollingly engage the entire keeper track rather than just one portion thereof. Further, the keeper member and track, in conjunction with the position of the trigger portion of the lever mechanism relative to a workpiece, can provide for release of the thread cutting dies at or near the end of a thread cutting operation as opposed to the disclosed arrangement wherein the thread cutting dies recede throughout the thread cutting operation. In particular, it will be appreciated that many keeper and track contours can be devised to achieve a desired control in conjunction with the receding displacement of the thread cutting dies, it only being important in connection with the present invention that the keeper member be supported for pivotal displacement about a keeper axis parallel to the die head axis so that the direction of interengagement between the keeper and track during operation of the mechanism is radial and circumferential relative to the die head axis. Still further, displacement of the keeper member in opposite directions about the keeper axis could be positively assured such as by forking the lever finger so as to radially capture the keeper finger, and the trigger on the radially inner end of the lever arm could be integral therewith as opposed to being mounted thereon for axial and pivotal displacement relative thereto. It will be appreciated too that other arrangements for interengaging the cam plate and a member corresponding in function to the cam plate slide for adjusting the initial positions of the threading cutting dies can be used and provided with a keeper track for the purpose set forth herein. These and other modifications of the preferred embodiment disclosed herein, as well as other embodiments of the invention, will be obvious or suggested to those skilled in the art from the preferred embodiment, whereby it is to be distinctly understood that the foregoing descriptive matter is to be interpreted merely as illustrative of the invention and not as a limitation.

Having thus described the invention it is claimed:

1. An annular thread cutting die head for a power driven threading machine, said die head having a die head axis and an entrance end and an exit end and comprising, a plurality of thread cutting dies, support plate means coaxial with said die head axis and supporting said cutting dies for displacement radially inwardly and outwardly of said die head axis, cam plate means coaxial with said support plate means and interengaged therewith for relative pivotal displacement in opposite directions about said die head axis, said cam plate means including means to displace said cutting ides radially inwardly and outwardly relative to said die head axis in response to said pivotal displacement in opposite directions thereabout, cam plate biasing means biasing said cam plate means to pivot about said die head axis in the direction to displace said cutting ides radially outwardly thereof, cam plate keeper means mounted on said support plate means for pivotal displacement between latched and released positions about a keeper axis parallel to said die head axis, said keeper means in said latched position thereof engaging means on said cam plate means to position said cam plate means in a first angular position relative to said support plate means against the bias of said cam plate biasing means, said keeper means in said released position thereof disengaging said means on said am plate means, whereby said cam plate biasing means displaces said cam plate means to a second angular position relative to said support plate means, and actuator means on said support plate means for controlling pivotal displacement of said keeper means from said latched to said released position thereof, said actuator means being positioned for engagement by a work piece moving relative to said die head in the direction from said entrance toward said exit end.

2. A die head according to claim 1, wherein said actuator means includes lever means mounted on said support plate means for pivotal displacement about a lever axis transverse to said die head axis.

3. A die head according to claim 2, wherein said lever means includes lever arm means extending radially inwardly toward said die head axis and having a radially inner end, trigger means, and means supporting said trigger means on said radially inner end for pivotal displacement between first and second positions relative to said lever arm means, said trigger means in said first position being in the path of and engaged by a workpiece moving in said direction of threading to pivot said lever means about said lever axis, and said trigger means in said second position thereof being out of the path of said workpiece.

4. A die head according to claim 3, wherein said means supporting said trigger means includes means releasably interengaging said trigger means and lever arm means in said first position of said trigger means.

5. A die head according to claim 4, wherein said means releasably interengaging said trigger means and lever arm means includes spring biased detent means.

6. A die head according to claim 3, wherein said means supporting said trigger means includes mounting means mounting said trigger means on said inner end of said lever arm means for adjustment relative thereto in axially opposite directions with respect to said die head axis.

7. A die head according to claim 6, wherein said means supporting said trigger means includes spring biased detent means releasably holding said trigger means in said first position thereof.

8. A die head according to claim 1, wherein said means on said cam plate means includes keeper track means engaging said keeper means.

9. A die head according to claim 8, wherein said keeper means and said keeper track means have interengaging surface means whereby during displacement of said keeper means from said latched to said released position thereof said cam plate biasing means biases said cam plate means to progressively move from said first angular position toward said second angular position thereof.

10. A die head according to claim 9, wherein said keeper means includes keeper member means pivotal about said keeper axis and said surface means of said keeper means includes nose means on said keeper member means for displacement therewith about said keeper axis.

11. A die head according to claim 10, wherein said surface means on said keeper means further includes a roller member mounted on said keeper member.

12. A die head according to claim 1, wherein said cam plate means includes a cam plate member and a slide member, and means releasably interconnecting said cam plate member and slide member for pivotal displacement together and relative to one another about said die head axis.

13. A die head according to claim 12, wherein said means releasably interengaging said cam plate member and said slide plate member includes pin means on said slide plate member and a plurality of openings in said cam plate member and circumferentially spaced apart relative to said die head axis, said pin means being selectively receivable in any one of said openings to interengage said cam plate member and said slide member in a selected circumferential position relative to one another for pivotal displacement together about said die head axis.

14. A die head according to claim 13, and means biasing said pin means toward said openings.

15. A die head according to claim 12, wherein said slide member includes roller means engaging said support plate means to rollingly support pivotal displacement of said cam plate means between said first and second angular positions thereof.

16. An annular thread cutting die head for a power driven threading machine, said die head having a die head axis and an entrance end and an exit exit end and comprising, a plurality of thread cutting dies, annular support plate means coaxial with said die head axis and supporting said cutting dies for displacement radially inwardly and outwardly of said die head axis, annular cam plate means coaxial with said support plate means and interengaged therewith for relative pivotal displacement in opposite directions about said die head axis, said cam plate means including means to displace said cutting dies radially inwardly and outwardly relative to said die head axis in response to said pivotal displacement in opposite directions thereabout, cam plate biasing means biasing said cam plate means to pivot about said die head axis in the direction to displace said cutting dies radially outwardly thereof, keeper means mounted on said support plate means for pivotal displacement between latched and released positions about a keeper axis parallel to said die head axis, keeper track means on said cam plate means, said keeper means in said latched position thereof engaging said keeper track means to position said cam plate means in a first angular position relative to said support plate means against the bias of said am plate biasing means, said keeper means in said released position thereof disengaging said keeper track means, whereby said cam plate biasing means displaces said cam plate means to a second angular position relative to said support plate means, lever means mounted on said support plate means for pivotal displacement between first and second positions about a lever axis transverse to said die head axis, said lever mean sin said first position thereof being in the path of a workpiece moving relative to said die head in the direction from said entrance end toward said exit end and being displaced by said workpiece toward said second position of said lever means, and said lever means and said keeper means including interengaging means, whereby said lever means controls displacement of said keeper means from said latched to said released position thereof as said lever means is displaced from said first to said second position thereof.

17. A die head according to claim 16, wherein said lever means includes lever arm means extending radially inwardly toward said die head axis and having a radially inner end, trigger means, and means supporting said trigger means on said radially inner ned for pivotal displacement between first and second positions relative to said lever arm means, said trigger means in said first position being in the path of a workpiece moving in said direction of threading to pivot said lever means about said lever axis, and said trigger means in said second position thereof being out of the path of said workpiece.

18. A die head according to claim 17, wherein said trigger means is pivotal about a trigger axis parallel to said lever axis and said means supporting said trigger means includes spring biased detent means releasably interengaging said trigger means and lever arm means in said first position of said trigger means.

19. A die head according to claim 18, wherein said means supporting said trigger means includes mounting means mounting said trigger means on said inner end of said lever arm means for adjustment relative thereto in axial opposite directions with respect to said die head axis.

20. A die head according to claim 18, wherein said cam plate means includes a cam plate member and a slide member, and means releasably interconnecting said cam plate member and slide member for pivotal displacement together and relative to one another about said die head axis.

21. A die head according to claim 20, wherein said means releasably interengaging said cam plate member and said slide plate member includes pin means on said slide plate member and a plurality of openings in said cam plate member and circumferentially spaced apart relative to said die head axis, said pin means being selectively receivable in any one of said openings to interengage said cam plate member and said slide member in a selected circumferential position relative to one another for pivotal displacement about said die head axis.

22. A die head according to claim 21, and means biasing said pin means toward said openings.

23. A die head according to claim 22, wherein said slide member includes roller means engaging said support plate means to rollingly support pivotal displacement of said cam plate means between said first and second angular positions thereof.

24. A die head according to claim 21, wherein said keeper track means is contoured for displacement of said keeper means from said latched position thereof to said released position thereof to cause said cam plate means to progressively move from said first angular position thereof toward said second angular position thereof.

25. A die head according to claim 24, wherein said keeper means includes keeper member means pivotal about said keeper axis, and nose means and roller means on said keeper member means for displacement therewith about said keeper axis, said roller means engaging said keeper track means in said second angular position of said cam plate means.

26. A die head according to claim 25, wherein said interengaging means includes lever finger means on said lever means and pivotal therewith about said lever axis and keeper finger means on said keeper means and pivotal therewith about said keeper axis, said cam plate biasing means biasing said keeper finger means against said lever finger means during displacement of said cam plate means from said first angular position toward said second angular position thereof.

27. A die head according to claim 26, wherein said cam plate means includes means to displace said cam plate means from said second angular position thereof to said first angular position against the bias of said cam plate biasing means, lever biasing means biasing said lever means toward said first position thereof and biasing said lever finger means against said keeper finger means to bias said keeper means from said released position thereof toward said latched position thereof during displacement of said cam plate means from said second angular position toward said first angular position thereof.

28. A die head according to claim 27, wherein said lever means includes lever arm means extending radially inwardly toward said die head axis and having a radially inner end, trigger means, and means supporting said trigger means on said radially inner end for pivotal displacement between first and second positions relative to said lever arm means, said trigger means in said first position being in the path of a workpiece moving in said direction of threading to pivot said lever means about said lever axis, and said trigger means in said second position thereof being out of the path of said workpiece.

29. A die head according to claim 28, wherein said trigger means is pivotal about a trigger axis parallel to said lever axis and said means supporting said trigger means includes spring biased detent means releasably interengaging said trigger means and lever arm means in said first position of said trigger means.

30. A die head according to claim 29, wherein said means supporting said trigger means includes mounting means mounting said trigger means on said inner end of said lever arm means for adjustment relative thereto in axially opposite directions with respect to said die head axis.

31. A die head according to claim 16, wherein said keeper track means is contoured for displacement of said keeper means from said latched position thereof to said released position thereof to cause said cam plate means to progressively move from said first angular position thereof toward said second angular position thereof.

32. A die head according to claim 31, wherein said keeper means includes keeper member means pivotal about said keeper axis, and nose means and roller means on said keeper member means for displacement therewith about said keeper axis, said roller means engaging said keeper track means in said second angular position of said cam plate means.

33. A die head according to claim 31, wherein said interengaging means includes lever finger means on said lever means and pivotal therewith about said lever axis and keeper finger means on said keeper means and pivotal therewith about said keeper axis, said cam plate biasing means biasing said keeper finger means against said lever finger means during displacement of said cam plate means for said first angular position toward said second angular position thereof.

34. A die head according to claim 33, wherein said cam plate means includes means to displace said cam plate means from said second angular position thereof to said first angular position against the bias of said cam plate biasing means, lever biasing means biasing said lever means toward said first position thereof and biasing said lever finger means against said keeper finger means to bias said keeper means from said released position thereof toward said latched position thereof during displacement of said cam plate means from said second angular position toward said first angular position thereof.

35. A die head according to claim 34, wherein said keeper means includes keeper member means pivotal about said keeper axis, and nose means and roller means on said keeper member means for displacement therewith about said keeper axis, said roller means engaging said keeper track means in said second angular position of said cam plate means.

* * * * *

UNITED STATES PATENT AND TRADEMARK OFFICE
CERTIFICATE OF CORRECTION

PATENT NO. : 5,199,928
DATED : April 6, 1993
INVENTOR(S) : Paul W. Gress et al

It is certified that error appears in the above-indentified patent and that said Letters Patent is hereby corrected as shown below:

Column 10, line 57, change "ides" to --dies --.
Column 11, line 4, change "am" to --cam --.
Column 12, line 47, change "am" to --cam --.
Column 12, line 55, change "mean sin" to --means in --.
Column 13, line 1, change "ned " to --end --.
          line 17, change "axial" to --axially --.
Column 14, line 48, change "for" to --from --.

Signed and Sealed this

First Day of March, 1994

Attest:

BRUCE LEHMAN

Attesting Officer

Commissioner of Patents and Trademarks